US012641299B2

(12) United States Patent
Radosavljevic et al.

(10) Patent No.: US 12,641,299 B2
(45) Date of Patent: May 26, 2026

(54) METHODS AND APPARATUSES FOR CONVERTING FILM GRAIN METADATA

(71) Applicant: InterDigital CE Patent Holdings, SAS, Paris (FR)

(72) Inventors: Miloš Radosavljevic, Rennes (FR); Philippe De Lagrange, Betton (FR); Edouard Francois, Bourg des Comptes (FR); Zoubida Ameur, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 7 days.

(21) Appl. No.: 18/719,603

(22) PCT Filed: Dec. 8, 2022

(86) PCT No.: PCT/EP2022/085063
§ 371 (c)(1),
(2) Date: Jun. 13, 2024

(87) PCT Pub. No.: WO2023/110642
PCT Pub. Date: Jun. 22, 2023

(65) Prior Publication Data
US 2025/0056064 A1      Feb. 13, 2025

(30) Foreign Application Priority Data
Dec. 17, 2021    (EP) ..................................... 21306830

(51) Int. Cl.
*H04N 19/85*      (2014.01)
*H04N 19/70*      (2014.01)
*H04N 21/4402*    (2011.01)

(52) U.S. Cl.
CPC ............. *H04N 19/85* (2014.11); *H04N 19/70* (2014.11); *H04N 21/4402* (2013.01)

(58) Field of Classification Search
None
See application file for complete search history.

(56) References Cited

U.S. PATENT DOCUMENTS

2016/0021399 A1*    1/2016    Gomila .................. H04N 19/46
375/240.18

FOREIGN PATENT DOCUMENTS

WO      WO 2021122365 A1      6/2021
WO      WO 2022212792 A1      10/2022

OTHER PUBLICATIONS

"Infrastructure of audiovisual services—Coding of moving video—Versatile supplemental enhancement information messages for coded video bitstreams", International Telecommunication Union, ITU-T Telecommunication Standardization Sector of ITU, Series H: Audiovisual and Multimedia Systems, Recommendation H.274, Aug. 2020, 86 pages.

(Continued)

*Primary Examiner* — Christopher Braniff
(74) *Attorney, Agent, or Firm* — Condo Roccia Koptiw LLP

(57) ABSTRACT

A method and an apparatus for converting film grain metadata are provided. In an embodiment, a first film grain metadata is obtained, the first film grain metadata complying with a first film grain syntax and being representative of a first film grain model. At least one part of the first film grain metadata is converted to at least one part of a second film grain metadata, the second film grain metadata complying with a second film grain syntax and being representative of a second film grain model, wherein the second film grain syntax is different from the first film grain syntax, or the second film grain model is different from the first film grain model, or both the second film grain syntax and the second (Continued)

film grain model are different from the first film grain syntax and the first film grain model.

15 Claims, 11 Drawing Sheets

(56) References Cited

OTHER PUBLICATIONS

De Rivaz et al., "AV1 Bitstream & Decoding Process Specification", The Alliance for Open Media, AOMedia, Version 1.0.0 with Errata 1, Jan. 8, 2019, 681 pages.

Sullivan et al., "Meeting Report of the 39th JCT-VC Meeting", Joint Collaborative Team on Video Coding (JCT-VC) of ITU-T SG16 WP3 and ISO/IEC JTC1/SC29/WG11, Document: JCTVC-AM1000-v2, 39th Meeting, by teleconference, Apr. 18, 2020, 42 pages.

McCarthy et al., "AHG9: Fixed-point grain blending process for film grain characteristics SEI message", Joint Video Experts Team (JVET) of ITU-T SG 16 WP 3 and ISO/IEC JTC 1/SC 29, Document JVET-W0095-v4, 23rd Meeting, by teleconference, Jul. 7, 2021, 4 pages.

Liu, Zoe, "CAE-Based Intelligent Optimization Algorithms for AVI Encoding", Mile High Video 2020, Dec. 1, 2020, 24 pages.

"Infrastructure of audiovisual services—Coding of moving video— Advanced video coding for generic audiovisual services", International Telecommunication Union (ITU-T), Telecommunication Standardization Sector of ITU, Series H: Audiovisual and Multimedia Systems, Recommendation ITU-T H.264, Aug. 2021, 844 pages.

"Infrastructure of audiovisual services—Coding of moving video— Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.

"Infrastructure of audiovisual services—Coding of moving video— High efficiency video coding", International Telecommunication Union (ITU), ITU-T Telecommunication Standardization Sector of ITU, Series H: Audiovisual and Multimedia Systems, Recommendation ITU-T H.265, Aug. 2021, 716 pages.

Lin, Jianhua, "Divergence measures based on the Shannon entropy", Institute of Electrical and Electronics Engineers (IEEE), IEEE Transactions on Information Theory, vol. 37, Issue No. 1, Jan. 1991, 7 pages.

Tourapis et al., "Film Grain Synthesis Support in AVC and HEVC", Joint Collaborative Team on Video Coding (JCT-VC) of ITU-T SG 16 WP 3 and ISO/IEC JTC 1/SC 29/WG 11, Document: JCTVC-AL0022-v1, 38th Meeting: Brussels, Belgium, Jan. 10, 2020, 7 pages.

Radosavljevic et al., "AHG9: Film grain estimation and film grain synthesis for VVC Film grain characteristics SEI message, film grain estimation and film grain synthesis modules", Joint Video Experts Team (JVET) of ITU-T SG 16 WP 3 and ISO/IEC JTC 1/SC 29/WG 11, Document: JVET-V0093-v3, 22nd Meeting, by teleconference, Apr. 20, 2021, 10 pages.

* cited by examiner

| AV1 | VVC HEVC | H.264/AVC |
|---|---|---|
| Autoregressive Model Variant-1 | Autoregressive Model Variant-2 | Frequency Filtering Model |

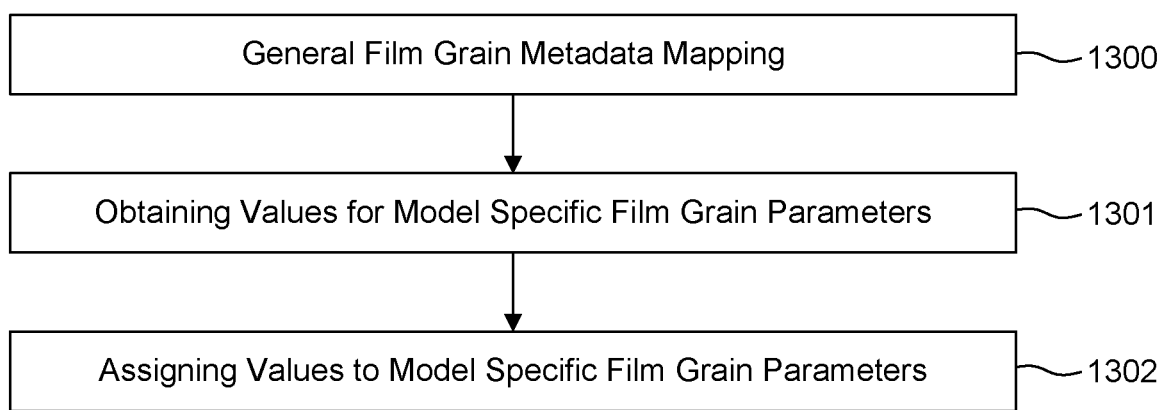

| General Film Grain Metadata Mapping | ⌐1300 |
| Obtaining Values for Model Specific Film Grain Parameters | ⌐1301 |
| Assigning Values to Model Specific Film Grain Parameters | ⌐1302 |

FIG. 13

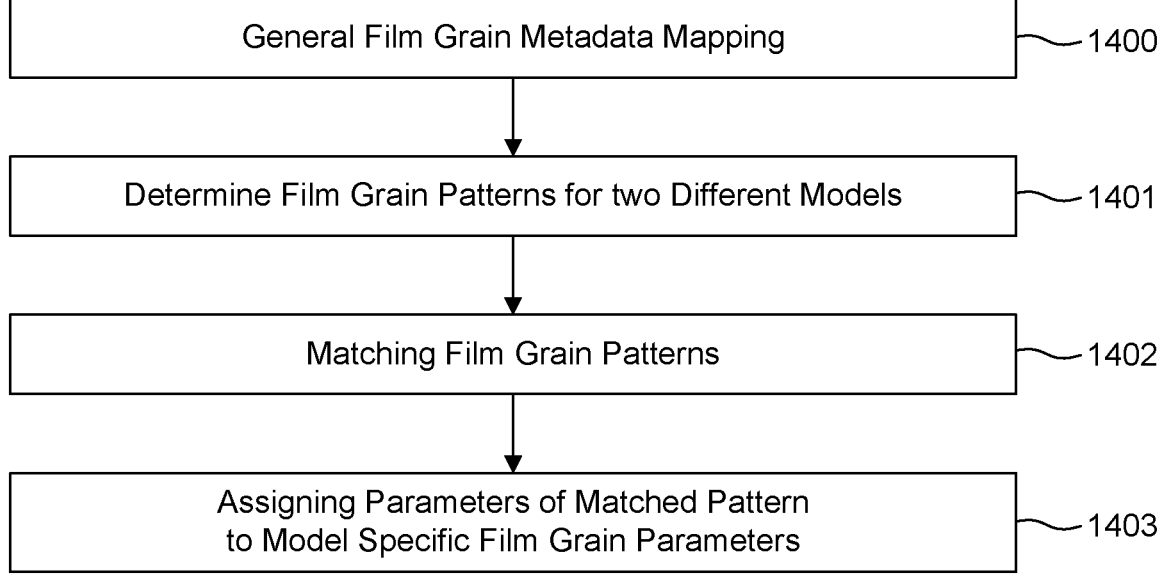

| General Film Grain Metadata Mapping | ⌐1400 |
| Determine Film Grain Patterns for two Different Models | ⌐1401 |
| Matching Film Grain Patterns | ⌐1402 |
| Assigning Parameters of Matched Pattern to Model Specific Film Grain Parameters | ⌐1403 |

FIG. 14

1600
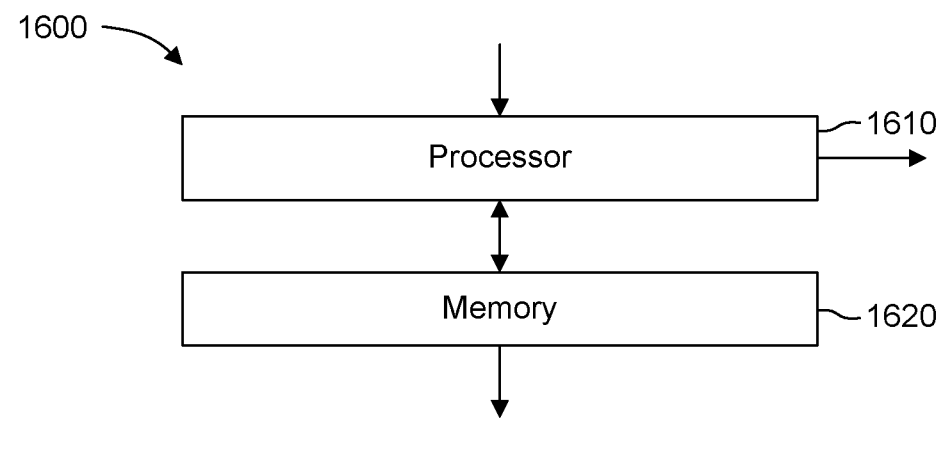
FIG. 16
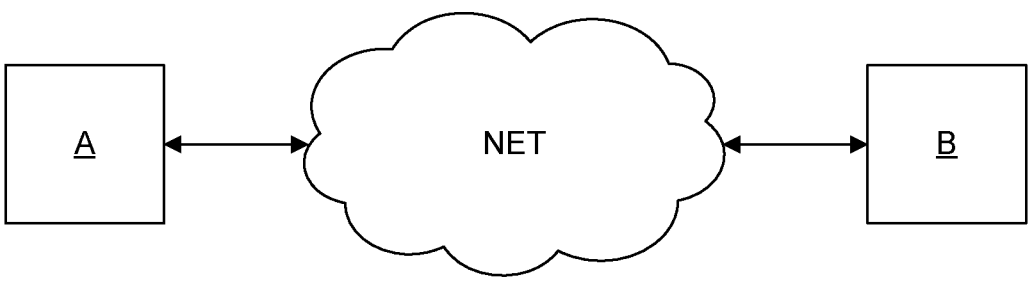
FIG. 17
| H | PAYLOAD |
|---|---|
FIG. 18

1

METHODS AND APPARATUSES FOR CONVERTING FILM GRAIN METADATA

CROSS REFERENCE TO RELATED APPLICATIONS

This application is a U.S. National Stage Application under 35 U.S.C. § 371 of International Patent Application No. PCT/EP2022/085063, filed Dec. 8, 2022, which is incorporated herein by reference in its entirety.

This application claims priority to European Application No. 21306830.7, filed Dec. 17, 2021, which is incorporated herein by reference in its entirety.

TECHNICAL FIELD

The present embodiments generally relate video compression, distribution and rendering, and more particularly to film grain modeling. The present embodiments relate to a method and an apparatus for film grain metadata conversion between codecs and/or between models.

BACKGROUND

To achieve high compression efficiency, image and video coding schemes usually employ prediction and transform to leverage spatial and temporal redundancy in the video content.

Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an aspect, a method for converting film grain metadata is provided. The method comprises obtaining a first film grain metadata, the first film grain metadata complying with a first film grain syntax and being representative of a first film grain model, converting at least one part of the first film grain metadata to at least one part of a second film grain metadata, the second film grain metadata complying with a second film grain syntax and being representative of a second film grain model, wherein the second film grain syntax is different from the first film grain syntax, or the second film grain model is different from the first film grain model, or both the second film grain syntax and the second film grain model are different from the first film grain syntax and the first film grain model.

According to another aspect, an apparatus for converting film grain metadata is provided. The apparatus comprises one or more processors, wherein the one or more processors are configured to obtain a first film grain metadata, the first film grain metadata complying with a first film grain syntax and being representative of a first film grain model, convert at least one part of the first film grain metadata to at least one part of a second film grain metadata, the second film grain metadata complying with a second film grain syntax and being representative of a second film grain model, wherein the second film grain syntax is different from the first film grain syntax, or the second film grain model is different from the first film grain model, or both the second film grain syntax and the second film grain model are different from the first film grain syntax and the first film grain model.

One or more embodiments also provide a computer program comprising instructions which when executed by one or more processors cause the one or more processors to perform the method for converting film grain metadata according to any of the embodiments described herein. One or more of the present embodiments also provide a computer readable storage medium having stored thereon instructions for converting film grain metadata according to the methods described above.

BRIEF DESCRIPTION OF THE DRAWINGS

FIG. 13 illustrates a block diagram of an example of a method for converting film grain metadata from a first format into a second format, according to another embodiment.

FIG. 14 illustrates a block diagram of an example of a method for converting film grain metadata from a first format into a second format, according to another embodiment.

FIG. 16 illustrates a block diagram of a system within which aspects of the present embodiments may be implemented, according to another embodiment.

FIG. 17 shows two remote devices communicating over a communication network in accordance with an example of the present principles.

FIG. 18 shows the syntax of a signal in accordance with an example of the present principles.

DETAILED DESCRIPTION

This application describes a variety of aspects, including tools, features, embodiments, models, approaches, etc.

Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
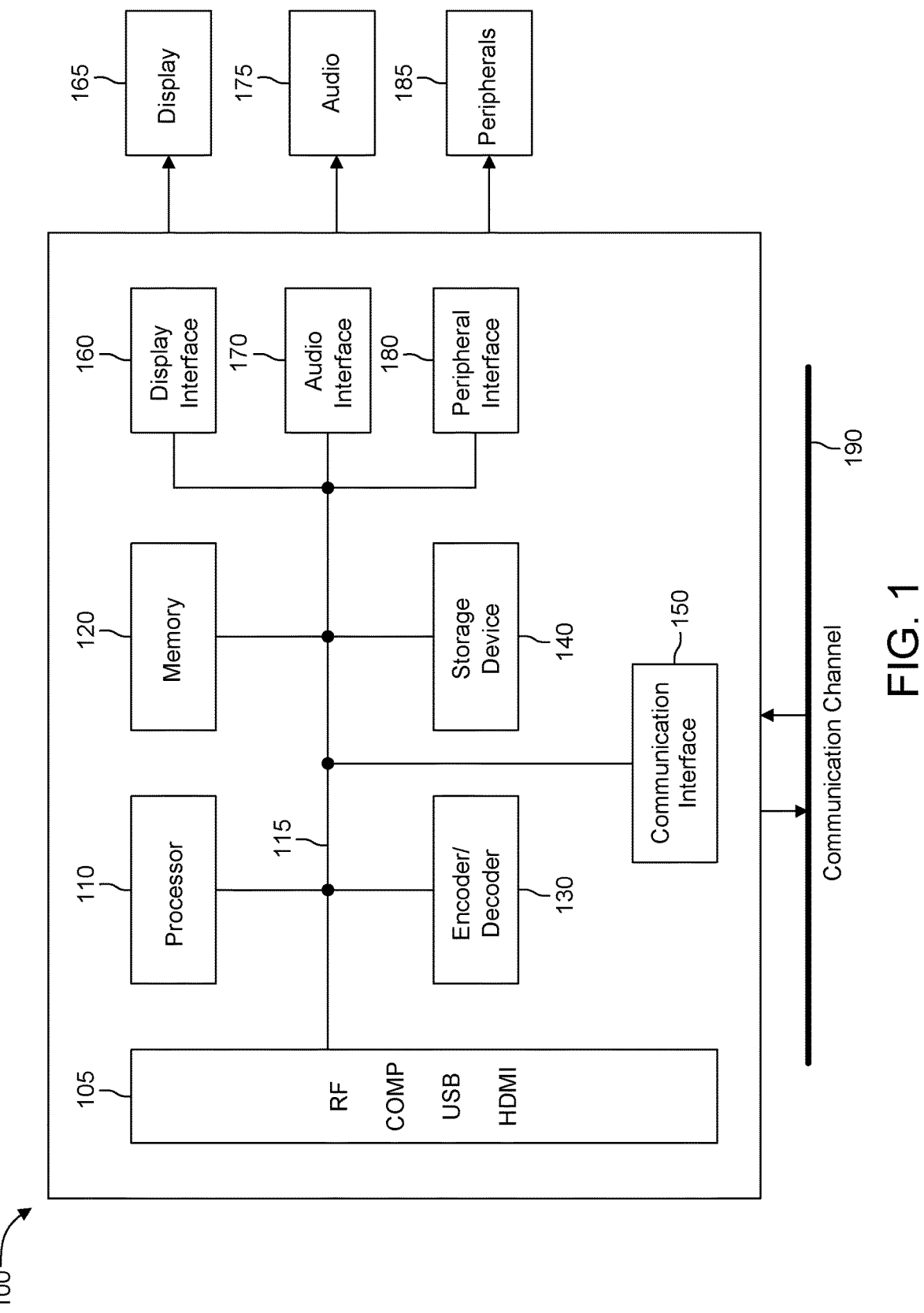
FIG. 1 illustrates a block diagram of a system within which aspects of the present embodiments may be implemented.
Figure 2:
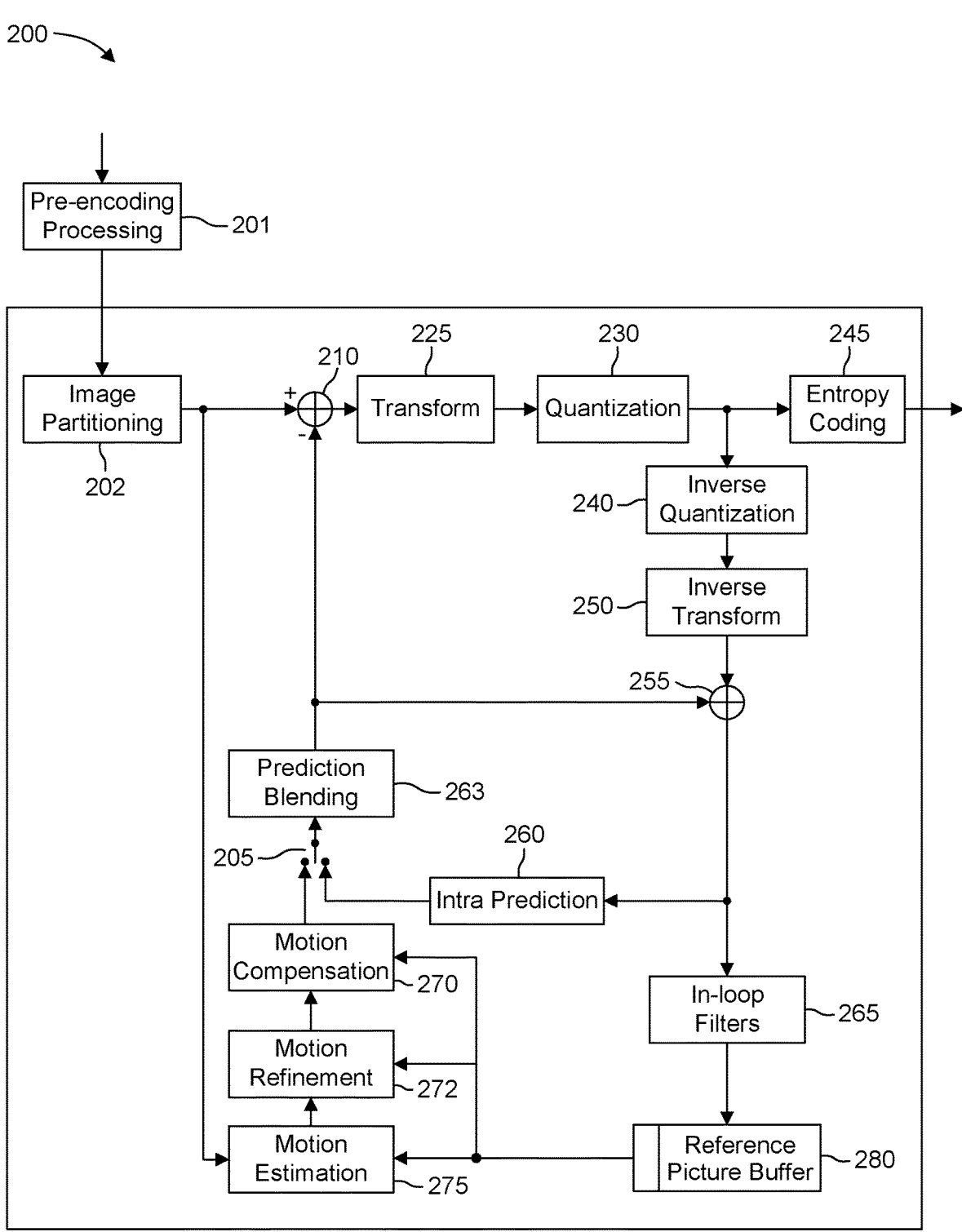
FIG. 2 illustrates a block diagram of an embodiment of a video encoder.
Figure 3:
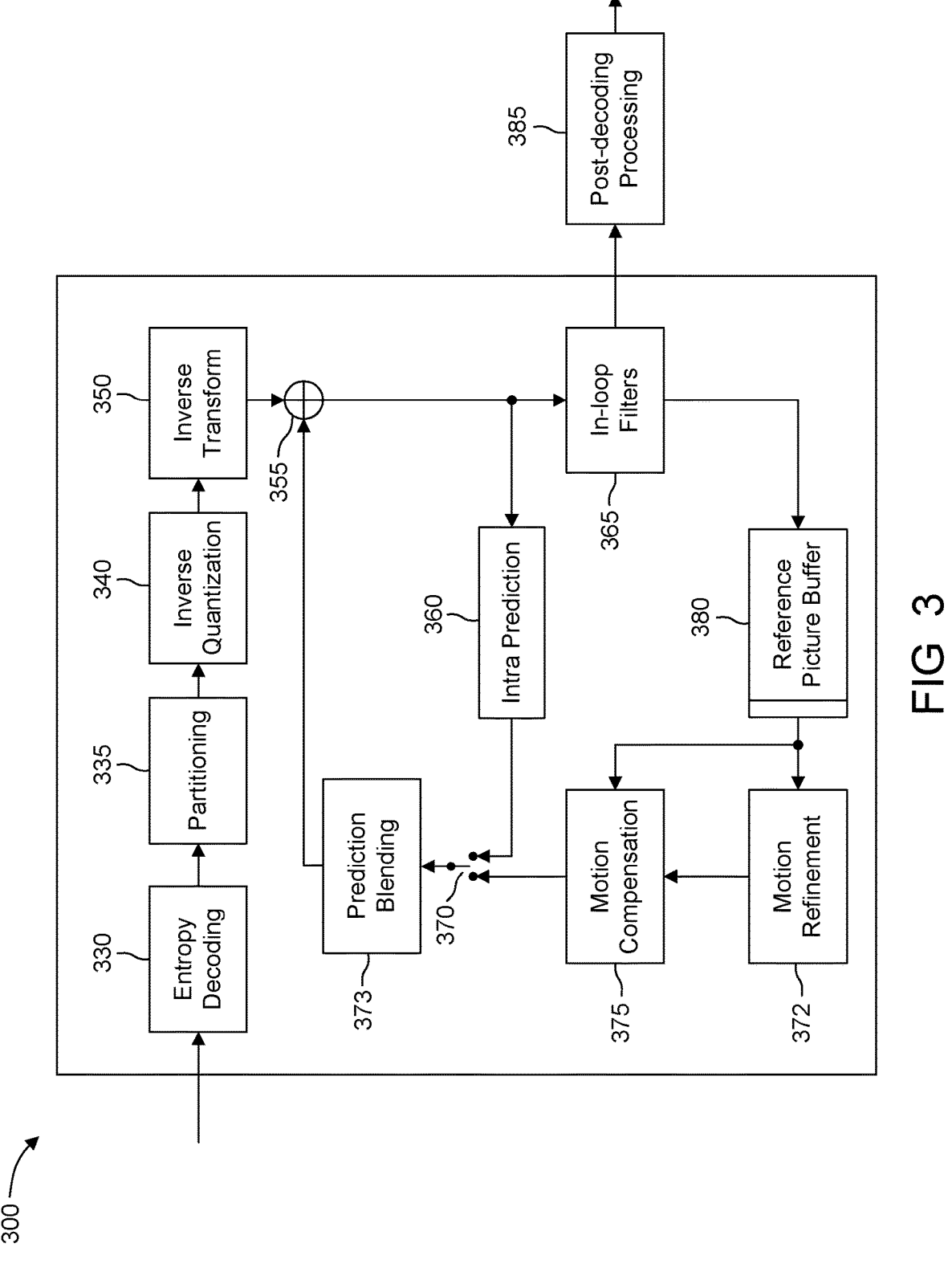
FIG. 3 illustrates a block diagram of an embodiment of a video decoder.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the forward transform module (225), inverse transform module (250) and entropy coding (245) of a video encoder 200 as shown in FIG. 2, and the inverse transform module (350) and entropy decoding (330) of a video decoder 300 as shown in FIG. 3. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In some embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 100 may be provided through various input devices as indicated in block 105. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1, include composite video.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which can be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data stream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the 12C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11 (IEEE refers to the Institute of Electrical and Electronics Engineers). The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105. As indicated above, various embodiments provide data in a non-streaming manner. Additionally, various embodiments use wireless networks other than Wi-Fi, for example a cellular network or a Bluetooth network.

The system 100 may provide an output signal to various output devices, including a display 165, speakers 175, and other peripheral devices 185. The display 165 of various embodiments includes one or more of, for example, a touchscreen display, an organic light-emitting diode (OLED) display, a curved display, and/or a foldable display. The display 165 can be for a television, a tablet, a laptop, a cell phone (mobile phone), or other device. The display 165 can also be integrated with other components (for example, as in a smart phone), or separate (for example, an external monitor for a laptop). The other peripheral devices 185 include, in various examples of embodiments, one or more of a stand-alone digital video disc (or digital versatile disc) (DVR, for both terms), a disk player, a stereo system, and/or a lighting system. Various embodiments use one or more peripheral devices 185 that provide a function based on the output of the system 100. For example, a disk player performs the function of playing the output of the system 100.

In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

The embodiments can be carried out by computer software implemented by the processor 110 or by hardware, or by a combination of hardware and software. As a non-limiting example, the embodiments can be implemented by one or more integrated circuits. The memory 120 can be of any type appropriate to the technical environment and can be implemented using any appropriate data storage technology, such as optical memory devices, magnetic memory devices, semiconductor-based memory devices, fixed memory, and removable memory, as non-limiting examples. The processor 110 can be of any type appropriate to the technical environment, and can encompass one or more of microprocessors, general purpose computers, special purpose computers, and processors based on a multi-core architecture, as non-limiting examples.

FIG. 2 illustrates an encoder 200. Variations of this encoder 200 are contemplated, but the encoder 200 is described below for purposes of clarity without describing all expected variations.

In some embodiments, FIG. 2 also illustrate an encoder in which improvements are made to the HEVC standard or an encoder employing technologies similar to HEVC, such as a VVC (Versatile Video Coding) encoder under development by JVET (Joint Video Exploration Team).

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of color components), or re-sizing the picture (ex: down-scaling). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods. Prediction residuals are calculated, for example, by subtracting (210) the predicted block from the original image block.

The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 illustrates a block diagram of a video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201), or re-sizing the reconstructed pictures (ex: up-scaling). The post-decoding processing can use metadata derived in the pre-encoding processing and signaled in the bitstream.

Film grain is a specific type of noise which appears in video which is very pleasant and very distinctive. In its essence, film grain is a result of physical processes of analog film stock exposure and development. A crystals of silver halide, light-sensitive chemical compound that is part of a film stock, turn into tiny specks of metallic silver when exposed to the sufficient light. An exposure to the light, controlled by a camera lens, triggers a chemical processes in silver halide crystals which are proportional to the amount of light absorbed by each crystal. Since not all the crystal specks are exposed equally, and since they come in different sizes and shapes and are randomly distributed within film emulsion, some of them are developed into metallic silver and some are not. Even more, within uniformly exposed area some crystals develop while others don't. Underexposed and undeveloped crystals undergo chemical removal during the development of a film, leaving tiny gaps between those that had reacted. During the negative printing, the empty gaps allow light to pass through, which creates the visual sensation of a film grain. In addition, developed crystals block light from passing through, and the more reaction occurs at the first place, the more light is blocked by the developed specks, leading to different intensity levels in the final pallet. Finally, those atomic changes are seen as a larger phenomenon, which, when all combined, is perceived as an image with a grainy texture.

In addition, the formation of a film grain is random because of the (quasi)-random formation of a metallic silver. More precisely, the process is quasi-random since physical properties of the photographic film are controlled by design and during the manufacturing. For example, silver crystals aren't perfectly and uniformly distributed in a grid pattern and film stocks have many different sizes of crystals in them. Larger the crystals, more sensitive to the light they are. The more sensitive film is to the light, the grain appears larger and more visible. Also, the size of the silver crystals in original emulsion, physical granularity of the crystals, the amount of exposure variation that a given film can tolerate, development time and even development temperature, are some parameters that influence film grain visibility and subjective feeling.

Technologically speaking, film stock is a product of past, considering it primitive from today's point of view. Digital era provided us with a vast of new possibilities to create and consume content. However, in a digital era, film grain is no longer present during the creation of a content. Noiseless and sharp video can be too perfect which, contrary to expectations, leads to the lower subjective experience of a viewer. Thus, to improve vividness of a digitally captured scene and/or to better contribute to the expression of the creative intent in the digital world, film grain is often added in the post-processing.

Nowadays it is widely known that moderate grainy texture presents a desirable feature. Digital artists choose film grain pattern that match a look and feel they want. However, to preserve film grain through the whole video processing and delivery chain is challenging. Visually lossless encoding which will not change and destroy film grain is only possible at very high bitrates. It is only feasible in high-quality applications, for example, cinema graded movie qualities. For common video applications, it will consume a lot of bandwidth. Thus, stronger lossy compression is an inevitable step within the current content distribution networks. It should be noted that, prior to delivery, video is also usually subjected to various pre-processing steps, where a noise filtering is presented to improve coding efficiency. Consequently, within various steps of filtering and lossy compression, the film grain is suppressed without the possibility of reconstructing it.

Figures 7, 8:
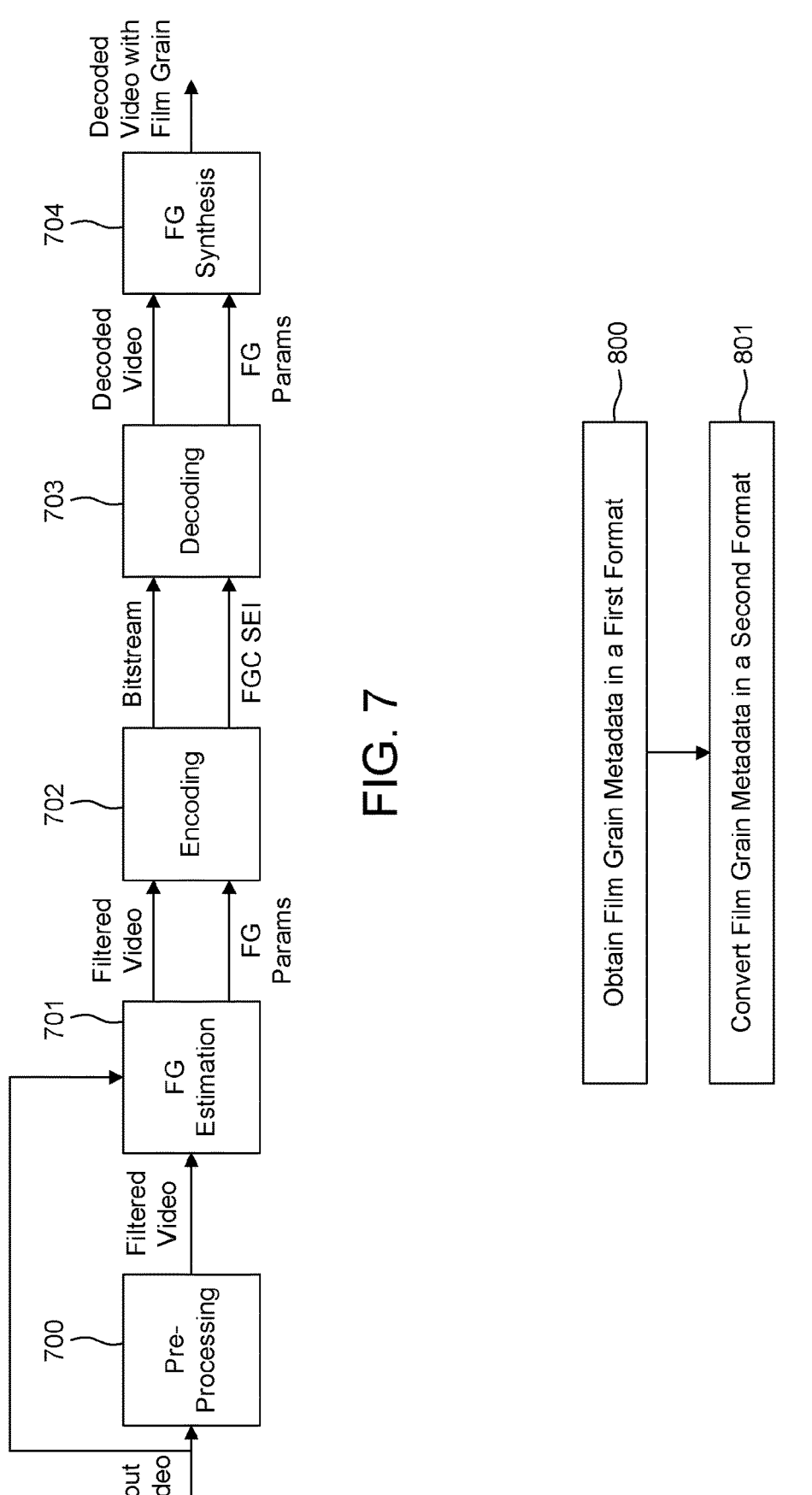
FIG. 7 illustrates a block diagram of an example of a film grain usage in a video coding framework.
FIG. 8 illustrates a block diagram of an example of a method for converting film grain metadata from a first format into a second format, according to an embodiment.

To address this problem, modern video compression and distribution systems can provide a mechanism to remove film grain prior to and/or during the compression and add it back at the user side in a controllable manner automatically by using parametric models. FIG. 7 illustrates a block diagram of an example of a film grain usage in a video coding framework. Typically, encoders remove the original film grain from a video (700) and tune the film grain model parameters (automatically in 701 or manually), and decoders replace it with a synthetic alternative that is visually close to the removed one (704). In such way, information on film grain is communicated as an additional metadata.

Automatic analysis of the original film grain (film grain analysis which is composed of a pre-processing for filtering an input video to encode 700 and Film Grain-FG-estimation 701) is an optional step. Model parameters can be either estimated using algorithmic/automatic approaches, or they can be manually tuned by the experts. In many cases, a person skilled in the art provides a manually selected set of film grain parameters (FG params) to the encoder (702) which encodes the filtered video into a bitstream. However, in some cases an automatic estimation of a parameters can be used directly to automate the process, or it can be used as an initialization step prior to manual tuning. In this way, the goal is to add back the synthetic grain to the video keeping in mind that the artistic intention remains unaltered. FG params are then communicated to the decoder (703) as an additional metadata, e.g., as a film grain characteristics (FGC) SEI message. The decoder (703) decodes the bitstream and outputs a decoded video and decoded FG params. The FG synthesis (704) then adds the film grain pattern to the decoded video by using the FG parameters to provide as output a decoded video with film grain.

Film grain is also getting more attention in the compression community where another, more technical use of a film grain is presented. It can be synthetized for video compression purposes to mask compression artifacts. In such scenario, when stronger compression is used, film grain is removed by the compression itself while at the same time other compression artifacts appear. Thereafter, film grain can be added to the compressed video to mask compression artifacts even if it was not present in the original content. Adding noise on the video during playback disguises compression, making video nicer to the eye at no bandwidth cost. Note, in this scenario it is not of great importance that film grain matches the removed one if any was presented in the source video. Important aspect is to re-noise the video by adding film grain to mask flat monotonous regions and other compression artifacts resulting from compression. Today's activities within the video compression community are more oriented towards compression masking use-case rather than to preserve the same look of the film grain for artistic purposes.

Currently, latest and most advanced video coding standards support film grain metadata. For instance, AV1 (*AV1 Bitstream & Decoding Process Specification, The Alliance for Open Media*, Version 1.0.0 with Errata 1, Jan. 18, 2019) and Versatile Video Coding (VVC, Versatile Video Coding, Recommendation ITU-T H.266 (August 2020)|*International Standard ISO/IEC* 23090-3) are two different coding standards enabling to deliver film grain metadata. HEVC (*High efficiency video coding, Recommendation ITU-T H.265* (August 2021)) and H.264/AVC (*Advanced video coding for generic audiovisual services, Recommendation ITU-T H.264* (August 2021)), also provides a means to transfer film grain model parameters to the decoder in a similar manner as VVC (these standards share the same film grain metadata).

Different approaches have been studied for film grain modeling. In the context of VVC, to restore the film grain in the compressed video, a frequency filtering solution to parametrize and resynthesize film grain can be used. VVC also supports autoregressive model, same as AV1. Even VVC and AV1 both support autoregressive approach, the models are not the same. AV1 and VVC define film grain metadata in their specifications. VVC does it through Versatile Supplemental Enhancement Information messages for coded video bitstreams (VSEI) specification (*Versatile supplemental enhancement information messages for coded video bitstreams, Recommendation ITU-T H.274* (August 2020)|International Standard ISO/IEC 23002-7), while AV1 integrates film grain syntax in a frame header and the film grain metadata is part of the specification itself. Support for film grain is therefore specified in a significantly different way in those two standards. Different syntax and semantics are used depending on a codec and/or on a model. Since different models can be used, as illustrated in FIG. 4, synthesis process and film grain blending are also defined differently.

Some embodiments of the present disclosure provide means for converting film grain model parameters and associated syntax from one format into another appropriate format with the standardized syntax.

Some embodiments described herein convert a metadata or set of syntax elements into an altered set of syntax elements that better meet the needs of end-user (e.g., decoder).

Figures 4, 5:
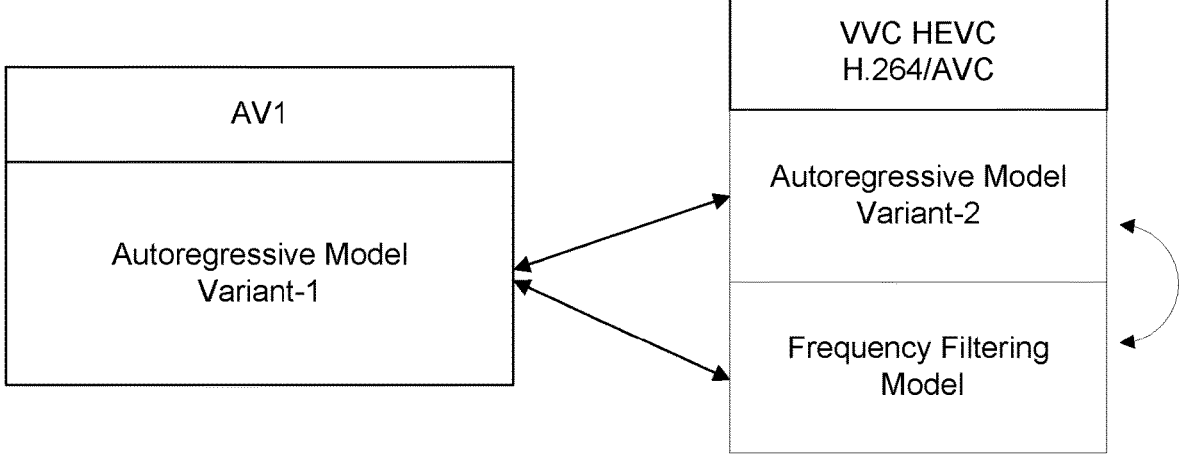
FIG. 4 illustrates examples of film grain models within video coding standards.
FIG. 5 illustrates possible conversion directions of film grain metadata.
Figure 6:
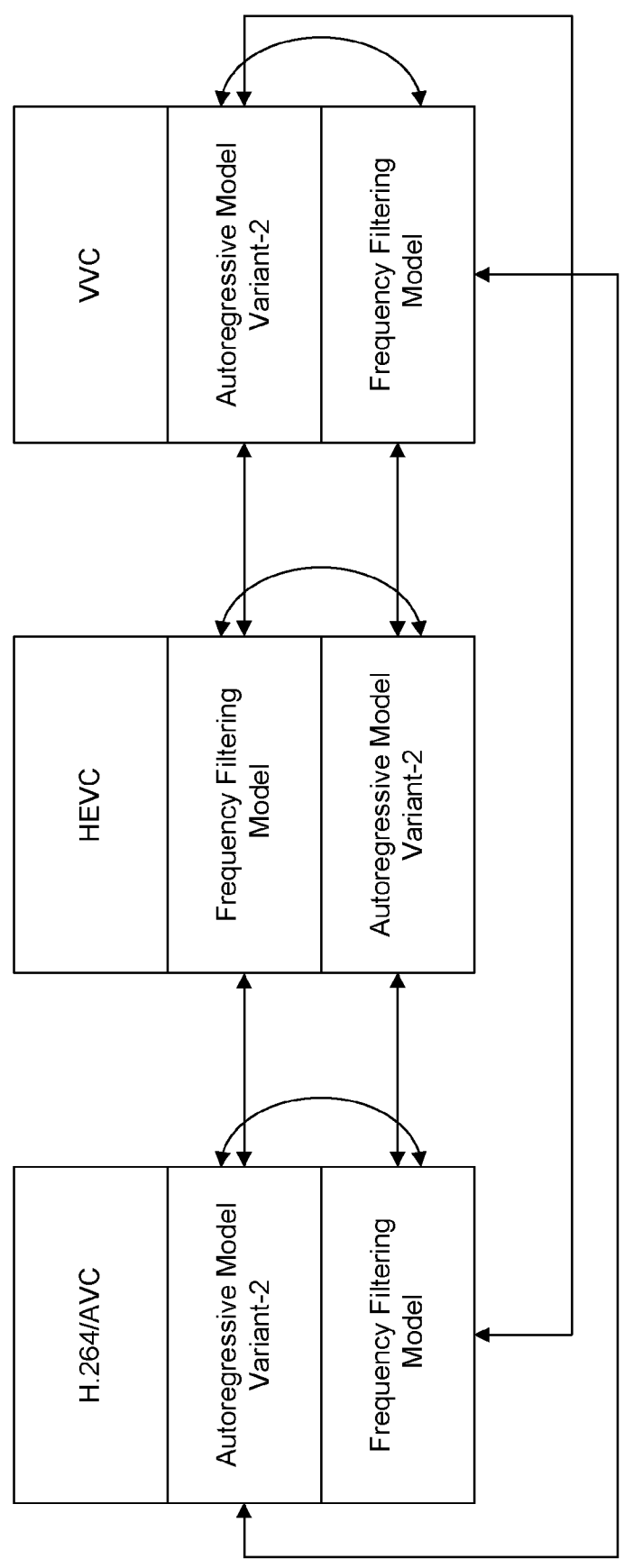
FIG. 6 illustrates possible conversion directions for cross-codec and cross-model conversion.

FIG. 5 and FIG. 6 provide examples of conversion directions. There are several possible conversions:

1. Convert AV1 film grain metadata into the VVC film grain metadata for autoregressive model and vice versa.
2. Convert AV1 film grain metadata into the VVC film grain metadata for frequency filtering model and vice versa.
3. Convert VVC film grain metadata for autoregressive model into the VVC film grain metadata for frequency filtering model and vice versa. The similar can be applied for HEVC and H.264/AVC, instead of VVC.
4. Conversion of frequency filtering model to autoregressive model and vice versa, where any combination of H.264/AVC, HEVC, and VVC applies.

According to an embodiment, a framework to convert film grain syntax and film grain model parameters from one format to another is provided. A conversion process is not a simple copy process since different syntax elements and semantics are in use, including different models. Also, conversion may not necessarily occur between codecs. For example, VVC film grain metadata supports two different film grain models, and in some circumstances, it is useful to enable conversion between the models of a same codec. It should be noted that other video coding standards such as High Efficiency Video Coding (HEVC) and H.264/AVC, for instance, also define similar film grain metadata as VVC. Hence, the conversion framework provided herein applies similarly for them as for VVC. In addition, film grain metadata conversion between VVC, HEVC or H.264/AVC can be defined if model conversion is required. Such a scenario is illustrated on FIG. 6.

On the other hand, a simple copy can be performed if conversion of the film grain metadata between VVC, HEVC or H.264/AVC is required, but no model conversion is requested. In fact, if no model conversion is performed, film grain metadata can be shared between VVC, HEVC or H.264/AVC since the format of metadata is the same.

Also, after conversion of the metadata, including the model parameters, new synthetized film grain pattern should match (at least visually) the original film grain pattern. In some embodiments however this requirement can be relaxed. It is to be noted that transcoding process does not introduce new syntax. The idea is to produce the metadata that is going to be directly embedded into the bitstream after conversion.

In the following, for simplicity purposes, the framework provided herein is described in the case of AV1 and VVC standards. However, the general principles described herein also apply to other video coding standards, such as HEVC, and H.264/AVC. Note that HEVC and H.264/AVC define the same film grain metadata as VVC. Thanks to that, to define all conversion directions from FIG. 6 is needless. More precisely, all conversion directions from FIG. 6 can be unambiguously defined by only defining the conversion between VVC models. Other conversion directions may reuse the conversion defined between VVC models. For example, to convert HEVC frequency filtering model to VVC autoregressive model variant-2 is the same as to convert VVC frequency filtering model to VVC autoregressive model variant-2. Or conversion between H.264/AVC autoregressive model variant-2 to HEVC frequency filtering model is the same as conversion between VVC autoregressive model variant-2 to VVC frequency filtering model. Hence, in the following, all definitions and examples applied for VVC also apply to H.264/AVC and HEVC.

An aim of the present disclosure is to provide a framework to convert a film grain metadata and related film grain model parameters to an appropriate format (e.g., a format supported by a video decoder).

Figures 9, 10:
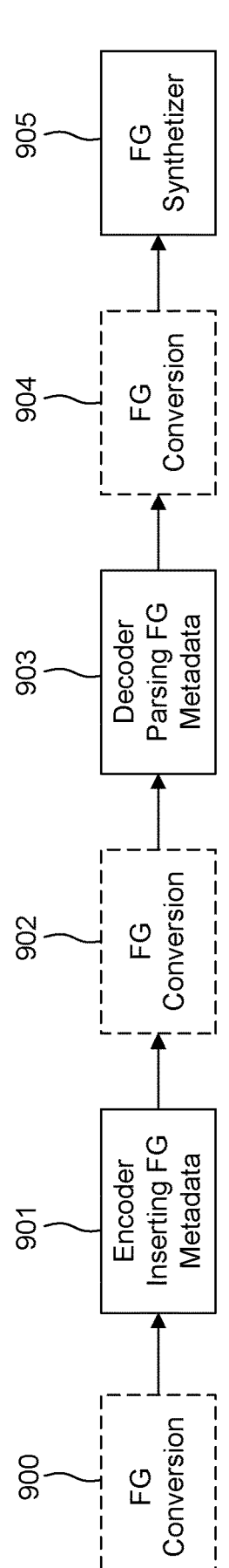
FIG. 9 illustrates examples of possible locations of film grain conversion in an encoding/decoding chain.
FIG. 10 illustrates a block diagram of an example of a method for converting film grain metadata from a first format into a second format, according to another embodiment.

As illustrated in FIG. 9, the conversion (FG conversion) can be achieved at different location of a video encoding/decoding chain depending on a use case:

1. The video encoder (901) provides the film grain metadata in format1. The video decoder (903) supports metadata format2. In this example, format1 is not understandable by the decoder, a conversion format1 to format2 can be performed before embedding the film grain metadata into the bitstream by the encoder. It can be implemented at the encoder (901) (or right after, as in step 902), but also conversion can be performed prior to the encoder, e.g., in pre-processing step (900).
2. In another example, the decoder (903) supports format2 but metadata coming from the bitstream is in format1. Thus, processes are needed at the decoder in order to produce an appropriate output (decoded video) with a film grain. Conversion can be performed before the bitstream is parsed by the decoder, at a stage between encoder and decoder (902).
3. In another example, the decoder (903) supports format1 coming from the bitstream. Decoder can extract film grain metadata from the bitstream. However, film grain synthesis implementation does not support film grain modeling using format1. Conversion of the film grain metadata can occur at a post-processing stage (904 or 905) to make synthesis run and to make it produce film grain output with a targeted quality. For instance, such a use case may occur in VVC if FGC SEI is sent to a decoder by incorporating frequency filtering model. The decoder is capable to parse the syntax, but at the decoder (or post-processing) side synthesis by using autoregressive model is implemented.
4. In another example, the encoder is provided with film grain metadata in format1 and format1 is embedded into the bitstream during the encoding. However, during the transcoding of the bitstreams, some decoders may require format2. In such case, conversion of the film grain metadata can occur after the encoding and before decoding (e.g., during the transcoding of the bitstreams). In such case, film grain metadata conversion is performed at step 902. One example of such use-case can be transcoding of AV1 bitstreams to the VVC bitstreams. In such case, if film grain metadata is presented in the AV1 bitstream, it should be converted rather than to be discarded.

In all cases, the film grain metadata conversion should be done in a way that the synthetized film grain after conversion visually matches (or closely approximates) the initial film grain look. In some embodiments, this requirement can be relaxed.

Some other requirements in terms of complexity or memory usage can be imposed as well. It is to note that transcoding process does not introduce new syntax. An aim of the present embodiments is to produce the metadata that is going to be directly embedded into the bitstream after transcoding.

Some embodiments relate to the conversion of metadata coming from one film grain metadata format into another film grain metadata format, wherein the formats differ from the video coding standards and/or the film grain model used for synthesizing the film grain pattern.

The principles described herein are based on examples coming from currently available standards and models supported within them. However, the present principles can also apply to other emerging standards and new models that may be available in the future.

As discussed above, the conversion process described herein can be implemented prior to the encoding of the video content, during the encoding, after encoding but before decoding, during the decoding or after the decoding of the video and before creating and blending film grain.

The use of such mechanism can be:

1. Prior to or during the encoding—to enable and ensure that the signaling of film grain parameters to a decoder is supported by the decoder itself.
2. At the decoder or post-processing stage if film grain synthesis implementation does not support the required model—if the decoder receives bitstream with the film grain parameters that are not supported by the film grain synthesis implementation it can convert the received film grain metadata and model parameters to the appropriate/understandable format/model.
3. During the transcoding of bitstreams to ensure film grain synthesis is going to be performed at the decoder side after transcoding is finished.

It is important to note that conversion of the metadata does not necessarily require encoding or/and decoding of the video bitstreams. For example, conversion of film grain syntax can be done based on the metadata provided in the configuration file. It also can be done by analyzing the encoded bitstreams without decoding them since the existing metadata can be extracted (and added back) from bitstream without actually decoding it. By doing that, only the film grain part can be extracted and decoded, thereafter processed, and embed back to the bitstreams at the right place.

FIG. 8 illustrates a method for converting film grain metadata from a first format into a second format. At 800, a first set of film grain metadata is obtained. The first set of film grain metadata complies with a first format of film grain metadata. A format of film grain metadata can include a specific syntax for transmitting syntax elements relating to the film grain data, the syntax being compliant with a video coding standard, and/or parameters of film grain model. In some embodiments, the first set of film grain metadata complies with a first film grain syntax and is representative of a first film grain model.

Depending on the embodiments, as described above since the conversion can be performed at different locations in the video coding framework, obtaining the first set of film grain metadata can include reading film grain metadata stored in memory, or estimating the film grain metadata from an input video, or receiving and parsing a bitstream comprising the film grain metadata, or receiving decoded film grain metadata from a decoder.

At 801, at least one part of the first set of film grain metadata is converted to at least one part of a second set of film grain metadata that complies with the second format. Thus, the second set of film grain metadata complies with a second film grain syntax and is representative of a second film grain model.

In a variant, the method can also comprise transmitting the converted second set of film grain metadata along with a coded video to a decoder or post-processing device.

As described above, the conversion can include converting the first set of film grain metadata from a first video standard to a second video standard, wherein the video standard defines the film grain syntax, and/or converting the first set of film grain metadata from a first film grain model to a second film grain model, the first and second film grain model belonging to a same or different video compression standard.

In the following, some examples of film grain syntax and models are described for AV1 and VVC video coding standards.

In AV1, film grain is based on an autoregressive model (Autoregressive Model Variant-1). The syntax is defined in *AV1 Bitstream & Decoding Process Specification, The Alliance for Open Media*, Version 1.0.0 with Errata 1, Jan. 18, 2019 in section 5.9.30: Film grain params syntax. Semantic of the parameters is given in section 6.8.20: *Film grain params semantics*. The synthesis process, how to create film grain patterns and how to blend them to the image, is described in section 7.18.3: *Film grain synthesis process.*

Note that in AV1 film grain synthesis is part of mandatory post-processing. It means that if film grain parameters are presented in the bitstream, synthesis process is invoked without exceptions, and output video with a film grain is produced.

MPEG codec family (VVC, HEVC, H264/AVC) supports two different models in its structure. Those are autoregressive model (Autoregressive Model Variant-2) and Frequency Filtering Model. Film grain metadata in VVC (and in HEVC and H.264/AVC) is communicated to the decoder via Supplemental Enhancement Information (SEI) messages. The syntax is defined in *Versatile Video Coding, Recommendation ITU-T H.266 (August 2020)|International Standard ISO/IEC* 23090-3 in Section 8.5: *Film grain characteristics SEI message*. The complete syntax and semantics are defined for both available models. In contrast to the AV1 film grain, VVC film grain specification only provides means on how to transfer film grain parameters to the decoder. However, it does not provide the exact description of the synthesis process. One example of a synthesis implementation based on the frequency filtering model that uses FGC SEI message as defined in VVC is provided in Sean McCarthy, Peng Yin, Walt Husak, Fangjun Pu, Taoran Lu, Tao Chen, Edouard François, Miloš Radosavljević, Vijayakumar G R, Kaustubh Patankar, Shireesh Kadaramandalgi, Ajayshyam, "*AHG9: Fixed-point grain blending process for film grain characteristics SEI message*", JVET-W0095, Teleconference, 7-16 Jul. 2021. Also, adding film grain is not mandatory process in VVC even if film grain SEI is presented in the bitstream (it can be simply discarded by the decoder).

In general, there are two sub-sets of syntax elements used in film grain metadata. A first sub-set is composed of the syntax elements that are not directly related to the model parameters. They are considered as an additional syntax used to support the transfer of the model parameters. It can be named the General Film Grain Metadata.

A second sub-set is composed of Model Specific Film Grain Parameters.

An example of those two sets for VVC is given in the Table 1 below. Note that model specific parameters are the same for frequency filtering and autoregressive model variant-2. However, interpretation of syntax is different based on the model.

TABLE 1

General and Model Specific Film Grain Parameters
for VVC (Autoregressive model variant-2
and Frequency filtering model)

GENERAL FILM GRAIN METADATA

```
fg_characteristics_cancel_flag
fg_model_id
fg_separate_colour_description_present_flag
if( fg_separate_colour_description_present_flag ) {
    fg_bit_depth_luma_minus8
    fg_bit_depth_chroma_minus8
    fg_full_range_flag
    fg_colour_primaries
    fg_transfer_characteristics
    fg_matrix_coeffs
}
fg_blending_mode_id
```
MODEL SPECIFIC FILM GRAIN PARAMETERS

```
fg_log2_scale_factor
for( c = 0; c < 3; c++ )
    fg_comp_model_present_flag[ c ]
for( c = 0; c < 3; c++ ) {
    if( fg_comp_model_present_flag[ c ] ) {
        fg_num_intensity_intervals_minus1[ c ]
        fg_num_model_values_minus1[ c ]
        for( i = 0; i <= fg_num_intensity_intervals_minus1[ c ]; i++ ) {
            fg_intensity_interval_lower_bound[ c ][ i ]
            fg_intensity_interval_upper_bound[ c ][ i ]
            for( j = 0; j <= fg_num_model_values_minus1[ c ]; j++ ) {
                fg_comp_model_value[ c ][ i ][ j ]
            }
        }
    }
}
fg_characteristics_persistence_flag
```

For simplicity, it is assumed here that fg_separate_colour_description_present_flag is set to 0. The given flag is required in specific use-cases when decoded image is not in the same color representation domain as the simulated film grain. Here, it can be assumed that film grain and video color spaces are the same.

Film grain metadata for AV1 is different. It is given in the Table 2 below.

TABLE 2

General and Model Specific Film Grain Parameters
for AV1 (Autoregressive model variant-1)

GENERAL FILM GRAIN METADATA

```
film_grain_params_present
apply_grain
grain_seed
update_grain
film_grain_params_ref_idx
```
MODEL SPECIFIC FILM GRAIN PARAMETERS

```
num_y_points
for ( i = 0; i < num_y_points; i++ ) {
    point_y_value[ i ]
    point_y_scaling[ i ]
}
# if monochrome => chroma_scaling_from_luma=0
chroma_scaling_from_luma
if ( monochrome || chroma_scaling_from_luma || num_y_points )
{
    num_cb_points=0; num_cr_points=0;
}
else
{
    num_cb_points
    for ( i = 0; i < num_cb_points; i++ ) {
        point_cb_value[ i ]
        point_cb_scaling[ i ]
    }
    num_cr_points
    for ( i = 0; i < num_cr_points; i++ ) {
        point_cr_value[ i ]
        point_cr_scaling[ i ]
    }
}
grain_scaling_minus_8
ar_coeff_lag
# numPosLuma = 2 * ar_coeff_lag * ( ar_coeff_lag + 1 )
# numPosChroma = numPosLuma + 1
if ( num_y_points ) {
    for ( i = 0; i < numPosLuma; i++ )
    ar_coeffs_y_plus_128[ i ]
}
if ( chroma_scaling_from_luma || num_cb_points ) {
    for ( i = 0; i < numPosChroma; i++ )
    ar_coeffs_cb_plus_128[ i ]
}
if ( chroma_scaling_from_luma || num_cr_points ) {
    for ( i = 0; i < numPosChroma; i++ )
    ar_coeffs_cr_plus_128[ i ]
}
ar_coeff_shift_minus_6
grain_scale_shift
if ( num_cb_points ) {
    cb_mult
    cb_luma_mult
    cb_offset
}
if ( num_cr_points ) {
    cr mult
    cr_luma_mult
    cr_offset
}
overlap_flag
clip_to_restricted_range
```

Based on the semantics of certain film grain syntax elements, a mapping between them can be defined. For general film grain metadata, simple relations can be defined. For model specific parameters, the conversion is more complex and should be implemented with respect to the requirements in terms of the quality of the film grain and with respect to the preservation of the original film grain look (if that is one of the requirements). Other requirements related to complexity or memory requirements may be imposed. For example, if the computational resources are limited, conversion process can only convert general film grain metadata and use default values for model specific parameters.

Some embodiments to convert film grain metadata given in Table 1 and Table 2 are described below. In FIG. 4, different conversion depending on the input and output formats are indicated. Embodiments provided herein may be implemented in different ways, with different requirements in term of memory, complexity and/or on the final quality of a synthesized film grain (after metadata conversion).

According to an embodiment, different conversion modes are provided, each conversion mode corresponding to a variant of the present principles. They are summarized as follows:

1. Discard—according to this variant, conversion is performed in a way that minimum subset of parameters is provided so the decoder can handle the bitstream syntax, but it does not synthetize film grain. This is an alternative way that do not render a film grain and can produce significantly different output than it was expected. However, it is the less demanding process in terms of computations and memory.
2. Random—according to this variant, general film grain metadata are converted, but for specific model parameters, random values are used.
3. Default—according to this variant, general film grain metadata are converted, but for model specific parameters, default values are used, that are defined a priori for each model type. In total, three group of default parameters can be provided, one for each model (frequency filtering, autoregressive variant-1 and autoregressive variant-2). In addition, for each model several different configurations can be defined a priori, reflecting different film grain appearance.
4. Mapping—according to this variant, complete film grain metadata are converted with a precision as higher as possible. An aim is to achieve a visual match after conversion with the original film grain pattern before conversion.

Different modes reflect different complexity, memory, and quality requirements. In any case, the original video coded stream remains untouched, only the metadata is converted or discarded/ignored.

According to this embodiment, a conversion mode can be selected by the device implementing the conversion based on the requirements. The selection can be made among the above cited conversion modes or among a subset of these modes. According to another embodiment, the selection can be made by a user.

According to another embodiment, each one of the variants described herein can be implemented independently from the others. In this case, there is no need for a selection of a conversion mode by the device, as the device may implement only one of the variants.

Variant: Discard Mode

In a variant, named Discard mode, the process simply ignores the existing film grain metadata and it does not perform synthesis of a film grain. Instead, it removes/ignores input film grain metadata or sets appropriate flags in a way that film grain synthesis is not performed afterwards. There are several ways how to implement this depending on a conversion direction.

In a first variant, if VVC film grain metadata needs to be converted (model type is not important at this particular mode) to AV1 metadata, either film_grain_params_present or apply_grain flag should be set to 0. Since film_grain_params_present or apply_grain is 0, it does not require any other syntax elements.

In another variant, if AV1 film grain metadata needs to be converted to VVC film grain metadata in a discard mode, one option is to just ignore all the metadata and not embed it in the VVC bitstream. This is possible since film grain metadata is not mandatory part of a VVC bitstream, and there is no strict requirement to have a film grain SEI created and encoded in a bitstream. Another option is to create SEI and embed it in the bitstream, however fg_characteristics_cancel_flag should be set to 1. Since fg_characteristics_cancel_flag is 1, other syntax elements are not required.

In another variant, when conversion between VVC models is performed in a discard mode (VVC autoregressive variant-2 to VVC frequency filtering or vice versa), the same as in the previous example applies. Simply by discarding film grain SEI from the bitstream or by setting fg_characteristics_cancel_flag to 1, the decoder can handle the bitstream without the need for other syntax elements to be converted. However, it will not produce an output with a film grain. Discard mode is a straightforward solution that does not require any significant processing power or memory; however it may produce undesirable results when film grain is expected to be synthetized and added to the decoded video.

Variant: Random Mode

FIG. 10 illustrates an example of a method for converting film grain metadata from a first format to a second format according to another variant, that is named here random mode. In this variant, only general film grain metadata is converted, while model specific film grain parameters are set in a random manner. At 1000, general film grain metadata is converted by mapping one or more syntax elements of the first format to one or more syntax elements of the second format. At 1001, random values are assigned to the model specific parameters. In such case, model specific parameters may be limited by the supported range and parameters are initialized by taking the random value from that range.

VVC to VVC

In an example, the simplest conversion is between VVC models. All general film grain metadata is kept the same, except fg_model_id flag. It should be changed in a way that new value is represented by ~fg_model_id, where ~ is negation of the flag. Then, model specific film grain parameters are set in a random manner however with the respect to the supported value range.

VVC to AV1 and Vice Versa

Conversion between VVC and AV1 or vice versa is more complex. It requires mapping of the general film grain metadata. Model specific film grain parameters are set in a random manner, same as in previous examples, and with the respect to the supported value range. In such example, conversion is established as following. There are two stages, namely mapping stage and expansion stage. Mapping stage produces relations between existing parameters and between parameters where logical and/or mathematical relations may be observed. Expansion stage adds the other parameters that are not mapped at the first stage.

VVC to AV1

In another example, in the mapping stage, fg_characteristics_cancel_flag maps to film_grain_params_present and apply_grain. If fg_characteristics_cancel_flag is set to 1, film_grain_params_present and apply_grain are set to 0. Afterwards, there is no need to transmit other syntax elements, and hence no need to convert them as well. If fg_characteristics_cancel_flag is set to 0, film_grain_params_present and apply_grain are set to 1.

There is no need to convert fg_model_id flag since in AV1 there is only one model available. No matter what, VVC's model needs to be converted to AV1 model, it is converted in the same way. Hence this conversion applies to both Frequency filtering model and Autoregressive model variant-2, when they need to be converted to Autoregressive model variant-1.

Also, there is no need to convert fg_blending_mode_id since only additive blending is defined in AV1. Even fg_blending_mode_id indicates that multiplicative blending is used within VVC film grain modeling, it should not affect the outcome of this random mode conversion since random parameters will be used for generating film grain anyway.

If fg_characteristics_persistence_flag is 0 (means that the film grain applies to the current decoded picture only), it indicates that update_grain should be 1 (it means that new film grain parameters need to be sent).

If fg_characteristics_persistence_flag is 1, still for the current frame update_grain is 1. However, it has implications to the future frames. For future frames update_grain is set to 0 and film_grain_params_ref_idx is set to the index of the current frame until one of the following conditions is satisfied (as defined in film grain specification in VSEI):

A new CLVS of the current layer begins

The bitstream ends

A picture in the current layer in an access unit associated with film grain characteristics SEI message is output that follows the current picture in the output order.

Hence, after one of the given conditions is satisfied, possibly new film grain SEI is sent within the VVC bitstream, and the process repeats. In essence it means that the film grain metadata is reused for all future frames until one of the given conditions applies. Hence, for the future frames that does not carry film grain SEI, film grain is still applied until one of the conditions is satisfied. The given conditions basically reset the "scope" of the previous film grain SEI message. In AV1, it is equivalent to set update_grain to 0, meaning that the parameters from one of the previous frames are used. Compared to VVC, in AV1 it needs to be set to all frames until new set of parameters is embedded into the bitstream (a new set of parameters is indicated when update_grain is set to 1).

In mapping stage, for some syntax elements it is not possible to provide direct (or in some cases indirect) mapping. In such case, a priori defined "best-effort" values can be provided in expansion stage. In other words, in some specific implementation of the conversion process, a predefined value for those parameters where mapping does not exist can be used. Those parameters are then selected in a way it produces the best possible film grain quality.

The missing parameters are overlap_flag and grain_seed. overlap_flag defines if deblocking between film grain blocks is performed. For example, in Sean McCarthy, Peng Yin, Walt Husak, Fangjun Pu, Taoran Lu, Tao Chen, Edouard François, Miloš Radosavljević, Vijayakumar G R, Kaustubh Patankar, Shireesh Kadaramandalgi, Ajayshyam, "*AHG9: Fixed-point grain blending process for film grain characteristics SEI message*", JVET-W0095, Teleconference, 7-16 Jul. 2021, which represents one possible implementation design for VVC film grain synthesis, deblocking is used by default without an option to disable it. In such case, it makes sense to set overlap_flag to 1. However, it uses additional resources, and hence this can be a design choice.

grain_seed is used in pseudo-number generator during the blending process. Since both synthesis algorithms (VVC's and AV1's) require seed to be initialized for each frame in order to ensure bit-exact reproduction, it can be reused between algorithms. The only difference is that VVC does not provide the seed as a parameter within the SEI, rather it is an implementation-oriented choice, while AV1 still incorporates seed within film grain metadata structure.

In addition, clip_to_restricted_range is equivalent to the fg_full_range_flag, and it should be set based on the input video range.

AV1 to VVC

In another example, in mapping stage, if film_grain_params_present and apply_grain are both set to 1, fg_characteristics_cancel_flag is set to 0. If one of film_grain_params_present or apply_grain flags are 0, fg_characteristics_cancel_flag is set to 1 and no further mapping is required since other parameters are not transmitted in such case.

grain_seed is not needed to be mapped since in VVC's syntax there is no seed parameter. Depending on an implementation, synthesis still needs to use seed to ensure bit-exact film grain generation, however it is implementation-dependent and not part of film grain metadata.

To map update_grain and film_grain_params_ref_idx to fg_characteristics_persistence_flag it is useful to observe not only the current frame but also other future frames. If update_grain is set to 1 it means that new set of film grain parameters is sent. For such frame it is needed to create new film grain SEI with appropriately converted parameters. However, some future frames can have update_grain set to 0 and film_grain_params_ref_idx pointing to the current frame. In such case, fg_characteristics_persistence_flag should be set to 1, meaning the current film grain SEI applies to the current decoded frame but also for the future frames in output order.

Figures 11, 12:
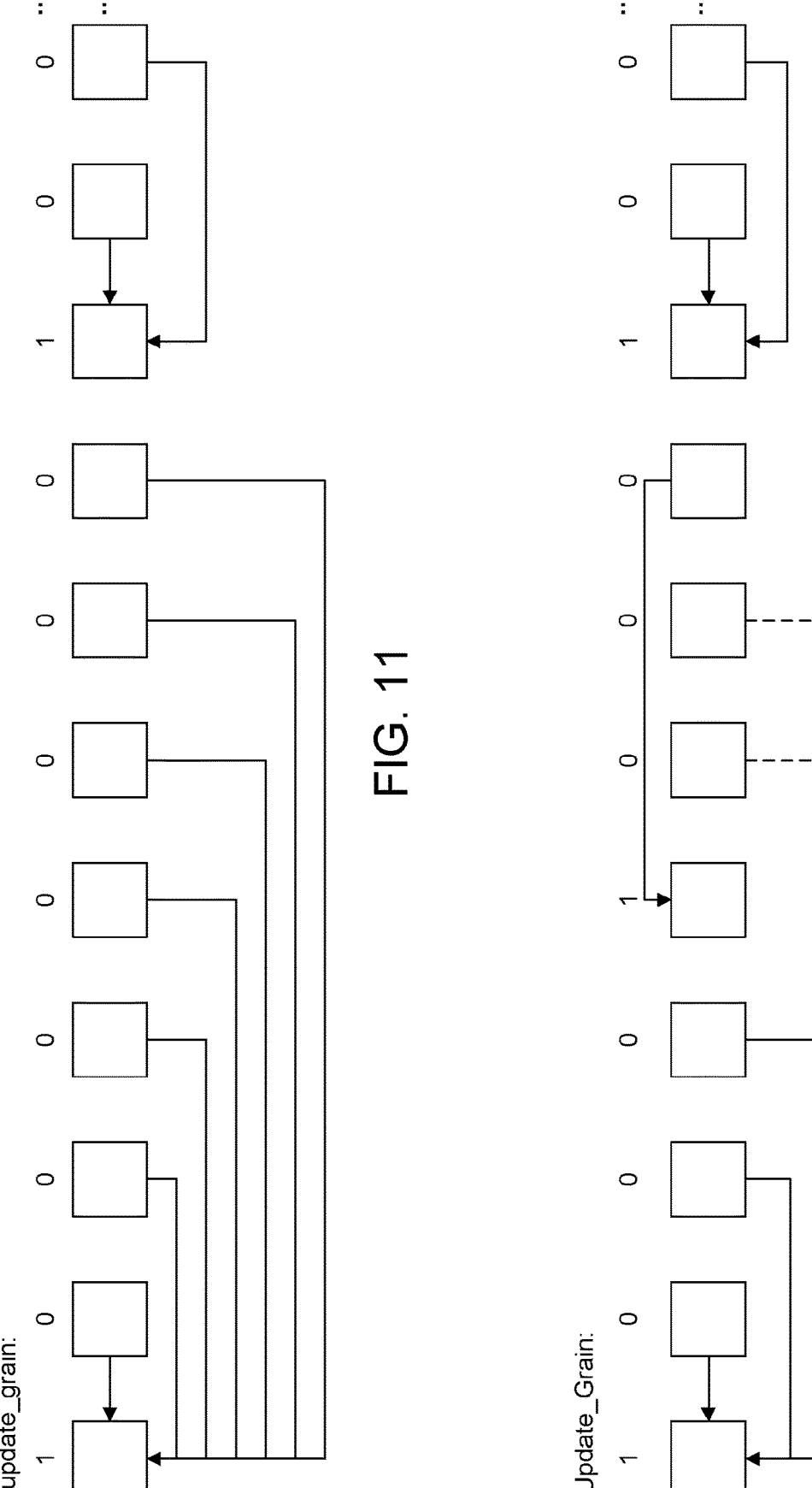
FIG. 11 illustrates an example of a use of an update_grain and film_grain_params_ref_idx syntax elements for AV1 film grain metadata.
FIG. 12 illustrates another example of a use of an update_grain and film_grain_params_ref_idx syntax elements for AV1 film grain metadata.

For example, in a situation given on FIG. 11, it is straightforward to perform metadata conversion. For the current (first) frame with the update_grain equal to 1, mapped and converted flag fg_characteristics_persistence_flag needs to be set to 1. Thereafter, for all frames that follows and that have update_grain equal to 0 there is no need to create associated film grain SEI. If fg_characteristics_persistence_flag is set to 1 and following frames do not have film grain SEI embedded in its structure, they will reuse the last known set of parameters, as it was the case before conversion from AV1. A new SEI is created next time for the next frame with update_grain equal to 1. Process repeats thereafter.

Another variant is illustrated on FIG. 12. In such case, the mapping described above in reference with FIG. 11 cannot be applied. The problem is caused by the connections represented with dashed lines. AV1 allows frames to reference to the film grain metadata from any previous frame by setting proper film_grain_params_ref_idx. However, in VVC it is only possible to re-use the latest available SEI. In the case illustrated on FIG. 12, the two frames with dashed connections cannot reuse indicated metadata since in VVC they'll be re-written by the new SEI message. One solution can be to create SEI at the "conversion time" for each frame and embed SEI for each frame by converting the parameters pointed with film_grain_params_ref_idx. Having an SEI per frame is possible in VVC, even advisable since it can ensure bit-exact reproduction in tricky mode. In such case, when it is needed to create SEI per frame, fg_characteristics_persistence_flag is set to 0 for each of those SEI messages.

To summarize, if the situation illustrated with FIG. 11 occurs, it is possible to set the current frame fg_characteristics_persistence_flag to 1, and to skip converting parameters and creating SEI message for any frame with update_grain equal to 0. New SEI is created in a same way when next frame with update_grain equal to 1 occurs. If the situation illustrated with FIG. 12 occurs, it is possible to set fg_characteristics_persistence_flag to 0 for the current frame and all other frames, and then to create SEI message for all frames even if update_grain is 0. In such case it is required to set fg_characteristics_persistence_flag to 0, and other parameters are converted as before. Note that parameters to be converted are taken from the frame indicated by film_grain_params_ref_idx. Then, random mode is used, other model specific parameters are set in random manner as explained above.

Note that this is just one possible illustration of a given problem. Possibly, there can be other situations where a similar logic can be applied.

Next, clip_to_restricted_range is equivalent to the fg_full_ range_flag, and it should be set based on the input video range. Also, overlap_flag is indicating if deblocking is going to be performed or not. In VVC SEI there is no such a parameter, hence it is left to the implementer to choose if deblocking of film grain blocks is applied or not during synthesis.

Thereafter, in expansion stage fg_blending_mode_id is set to 0 indicating additive blending. In some embodiments, it is possible to set it to 1 indicating multiplicative mode, but in such case model specific parameters needs to be adjusted to such blending mode. fg_model_id is set to either 0 or 1, depending on a targeted model after conversion. Since a random mode is used, model specific parameters are going to be set in a random manner and in accordance with a chosen model and blending mode.

Variant: Default Mode

In another variant, named Default mode, the process is in essence like the random mode, except that model specific parameters are defined in a way that some predefined set of parameters is used. FIG. 13 illustrates an example of a method for converting film grain metadata from a first format to a second format according to the default mode variant. At 1300, as for the random mode, general film grain metadata are mapped from the first format to the second format. At 1301, default values are obtained for model specific parameters. Several sets (different predefined sets of film grain specific model parameters) can be used, and an index of a set can be input to the conversion process. Thus, according to this variant, obtaining the values at 1301 can comprise determining the sets of specific model parameters and/or selecting a set of specific model parameters among the predefined sets. At 1302, the selected values are assigned to the specific model parameters in the second format.

In that way, more flexibility is given to select the most appropriate set of parameters. Compared to the random mode, the default mode can provide more meaningful conversion since model specific parameters can be manually selected and stored for further use. More controllable and more meaningful conversion is achieved in this mode compared to the random mode, but it requires predefined parameters to be stored.

Different predefined metadata is chosen for different models and blending modes. It is chosen based on different complexity or memory requirements, and in respect with final film grain look. General film grain metadata is converted as in random mode.

Variant: First Mapping Mode

Another variant, named first mapping mode, is provided below. It is to be noted that the name given to all the variants for film grain metadata conversion are for illustration and naming purposes, the name given to any one of variants is not a limitation and does not induce any specific characteristic to the variant.

The first mapping mode variant is the most demanding mode in terms of complexity. However, it aims at producing the best possible conversion in terms of preservation of the initial film grain appearance. The process aims at establishing an optimal mapping between all film grain syntax elements.

FIG. 14 illustrates an example of a method for converting film grain metadata from a first format to a second format according to the first mapping mode variant. At 1400, as for the random and default mode, general film grain metadata are mapped from the first format to the second format.

Then, conversion of model specific film grain parameters is performed.

According to a variant, at 1401, a first set of film grain patterns is determined from different parameters set of a first film grain model, and a second set of film grain patterns is determined from different parameters set of a second film grain model. An aim is to match the film grain patterns obtained from each film grain model. At 1402, a mapping between film grain patterns of the first set and film grain patterns of the second set is obtained. This can be performed in different ways.

Figure 15:
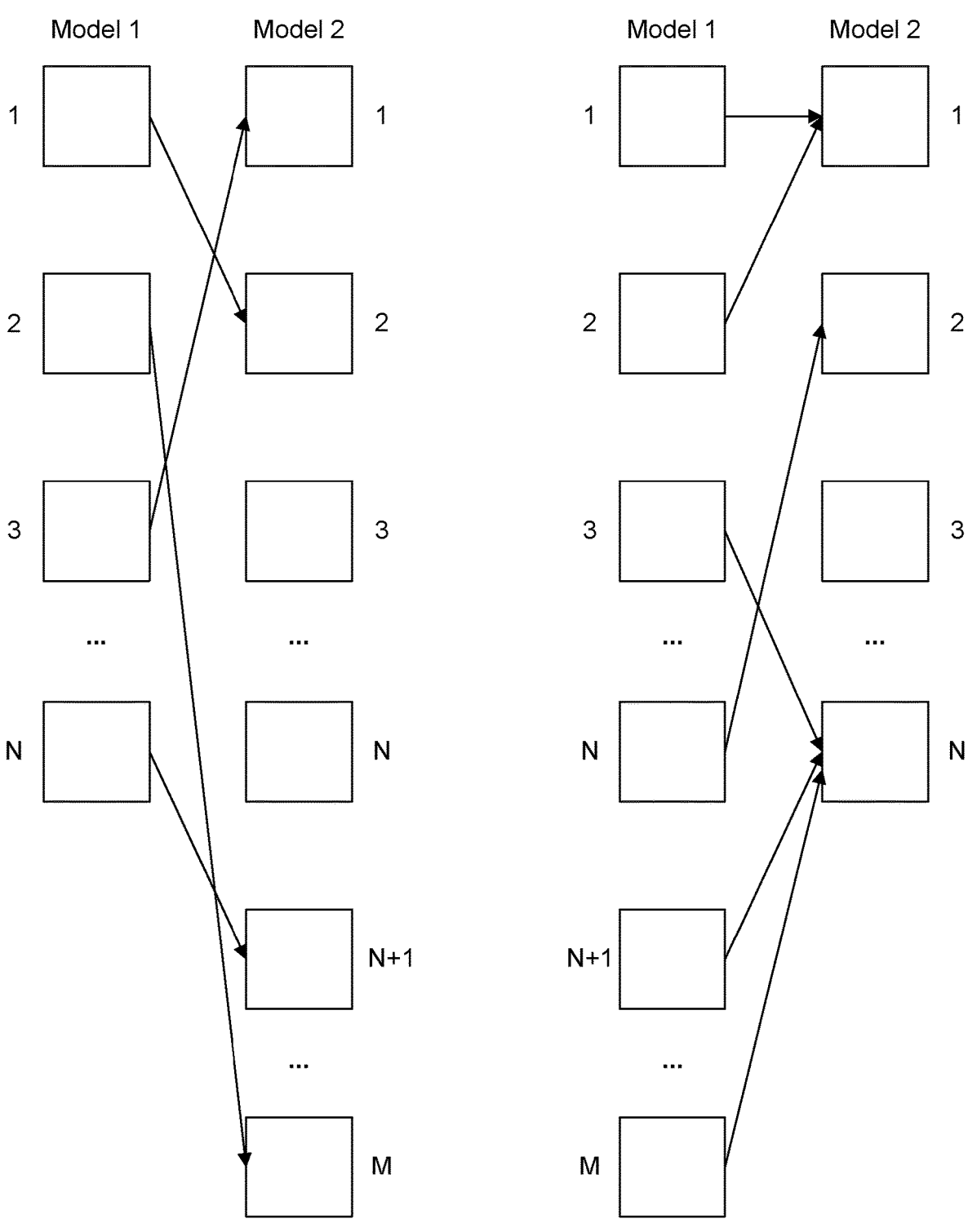
FIG. 15 illustrates examples of matching between film grain patterns obtained from sets of parameters of different film grain models.

According to one example, all possible film grain patterns are calculated off-line for different models. In an off-line phase, after the film grain patterns are calculated, different patterns coming from different models can be visually compared by experts to match the similar ones. For example, FIG. 15 illustrates possible visual matches and relationships with the different patterns of two models. Note that there is a limited number of different patterns that can be represented with one model. On the left part of FIG. 15, N patterns are mapped to M patterns where N<M. Thus, each pattern N can establish unique relationship with pattern from another model. On the right side of FIG. 15, M patterns of one model needs to establish relationship with N patterns of another model, where M>N. Thus, several patterns of one model are mapped to the same pattern of another model. Even if there is no unique mapping, this situation cannot be omitted in some cases, and compromise must be made. For example, AV1 supports much larger number of patterns that can be modeled compared to VVC. Thus, several AV1 film grain patterns are connected to one VVC pattern.

Since the model specific parameters for each pattern are known, the visual match between patterns leads to the parameter conversion between models. Thus, at 1403, a pattern from a film grain model in the second format is selected as the pattern that matches the pattern that would be obtained from the film grain model parameters of the first format. Thanks to the matching, each set of model parameters can be represented by another set of another model by just replacing the model parameters of the input film grain metadata with the parameters of its visual equivalent from another model. Since the given models are deterministic, visual match is performed only once and stored for the further use.

This approach can be used in any conversion direction mentioned above.

In another variant, a numerical technique is proposed to find relationships instead of visual matching of patterns. For example, at 1402, visual match is replaced by the minimization (or maximization) of some objective criteria. Divergence measures between two empirical probability distributions can be used to quantify the similarity between film grain patterns. One possibility is to use Jensen-Shannon Divergence (J. Lin, *"Divergence measures based on the Shannon entropy,"* IEEE Trans. Inf. Theory, vol. 37, no. 1, pp. 145-151, January 1991), which provides a method of measuring the similarity between two distributions. The more similar the patterns are, the smaller the JSD is. Thus, for one pattern, a match is associated with the minimal JSD between that pattern and other patterns coming from different models. For a particular pattern i, an associated match j that represents the most similar pattern coming from another model is given with the next relation:

$$j = \min_{j \in \{0, M-1\}} \{JSD(i, j)\}, \text{ where } i \in \{0, N-1\}$$

Other divergence measures can be used instead JSD as well. As before, this approach can be used in any conversion direction mentioned above.

Variant: Second Mapping Mode

As an alternative example, a second mapping mode is proposed to match a given number of values of model specific film grain parameters by finding analytical mapping between sets of parameter values that give a similar output (subject to the minimization criterion) thanks to a neural network.

In this variant, an aim is to determine the parameters of the neural network. The neural network does not necessarily need to be deep, and different type of network architectures can be used. It requires a training phase for determining the parameters of the neural network. However, once the neural network model is trained, it can then be used on-fly (at 1403) to convert model specific film grain parameters.

For a training phase pre-determined film grain patterns (for instance determined as in 1401 described above) and associated model specific parameters are used. Input attributes which comprise the parameters of a film grain model are typically given in a form of vector. Output attributes which comprise parameters of a mapped film grain are also vectors not necessarily having the same size as the input vector. A cost function of the neural network (i.e., optimization criterion) can be any objective metric that quantifies the similarity between two patterns obtained from the parameters of the film grin model input to the neural network, and the parameters of the film grain model obtained from the output of the neural network.

Once the neural network is trained, the parameters of the film grain model of the second set of film grain metadata are obtained as output of the neural network, which has been fed with the parameters of the film grain model of the first set of film grain metadata.

By adopting one of the variants provided here above, a delivered bitstream after decoding can produce the output pictures with a film grain. If mapping mode took place, a similar visual appearance of film grain is observed.

FIG. 16 illustrates a block diagram of a system within which aspects of the present embodiments may be implemented, according to another embodiment. FIG. 16 shows one embodiment of an apparatus 1600 for converting a first set of film grain metadata of a first format into a second set of metadata of a second format, according to any one of the embodiments described herein.

The apparatus comprises Processor 1610 and can be interconnected to a memory 1620 through at least one port. Both Processor 1610 and memory 1620 can also have one or more additional interconnections to external connections.

Processor 1610 is also configured to either receive the first set of film grain metadata of a first format, convert the first set of film grain metadata of the first format into the second set of metadata of the second format, and transmit the second set of metadata of the second format, using any one of the embodiments described herein. For instance, the processor 1610 is configured using a computer program product comprising code instructions that implements any one of embodiments described herein.

In an embodiment, illustrated in FIG. 17, in a transmission context between two remote devices A and B over a communication network NET, the device A comprises a processor in relation with memory RAM and ROM which are configured to implement a method for encoding a video, as described with FIGS. 1 and 2 and the device B comprises a processor in relation with memory RAM and ROM which are configured to implement a method for decoding a video as described in relation with FIGS. 1 and 3. Depending on embodiments, the device A and/or B is also configured for converting film grain metadata transmitted along with the coded video, either in the first format or in the second format as described in relation with FIGS. 4-15. In some embodiments, the device B is also configured for synthesizing film grain on the received video using the converted film grain metadata.

In accordance with an example, the network is a broadcast network, adapted to broadcast/transmit encoded video and converted film grain metadata from device A to decoding devices including the device B.

FIG. 18 shows an example of the syntax of a signal transmitted over a packet-based transmission protocol. Each transmitted packet P comprises a header H and a payload PAYLOAD. In some embodiments, the payload PAYLOAD may comprise coded video data encoded and converted film grain metadata according to any one of the embodiments described above.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, decode re-sampling filter coefficients, re-sampling a decoded picture.

As further examples, in one embodiment "decoding" refers only to entropy decoding, in another embodiment "decoding" refers only to differential decoding, and in another embodiment "decoding" refers to a combination of entropy decoding and differential decoding, and in another embodiment "decoding" refers to the whole reconstructing picture process including entropy decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, determining re-sampling filter coefficients, re-sampling a decoded picture.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

a. SDP (session description protocol), a format for describing multimedia communication sessions for the purposes of session announcement and session invitation, for example as described in RFCs and used in conjunction with RTP (Real-time Transport Protocol) transmission.

b. DASH MPD (Media Presentation Description) Descriptors, for example as used in DASH and transmitted over HTTP, a Descriptor is associated to a Representation or collection of Representations to provide additional characteristic to the content Representation.

c. RTP header extensions, for example as used during RTP streaming.

d. ISO Base Media File Format, for example as used in OMAF and using boxes which are object-oriented building blocks defined by a unique type identifier and length also known as 'atoms' in some specifications.

e. HLS (HTTP live Streaming) manifest transmitted over HTTP. A manifest can be associated, for example, to a version or collection of versions of a content to provide characteristics of the version or collection of versions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Some embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of re-sampling filter coefficients. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

A number of embodiments has been described above. Features of these embodiments can be provided alone or in any combination, across various claim categories and types.

The invention claimed is:

1. A method comprising:
obtaining a first film grain metadata, the first film grain metadata complying with a first film grain syntax and being representative of a first film grain model, and
converting at least one part of the first film grain metadata to at least one part of a second film grain metadata, the second film grain metadata complying with a second film grain syntax and being representative of a second film grain model, wherein the second film grain model is different from the first film grain model, and wherein syntax elements representative of parameters of film grain model are assigned based on a matching of film grain patterns obtained respectively for the first film grain model and for the second film grain model.

2. The method of claim 1, wherein at least one of the first film grain syntax or the second film grain syntax conforms with a video compression standard.

3. The method of claim 1, wherein converting at least one part of the first film grain metadata to at least one part of a second film grain metadata comprises:
identifying a film grain pattern in a set of film grain patterns obtained from different parameters of the second film grain model, that matches a film grain pattern obtained from parameters of the first film grain model of the first film grain metadata, and
assigning to syntax elements representative of the second film grain model of the second film grain metadata, film grain model parameters that provided the identified film grain pattern.

4. The method of claim 3, wherein converting at least one part of the first film grain metadata to at least one part of a second film grain metadata further comprises:
determining respectively a first set of film grain patterns from different parameters set of the first film grain model and a second set of film grain patterns from different parameters set of the second film grain model, and
obtaining a mapping between film grain patterns of the first set and film grain patterns of the second set.

5. The method of claim 4, wherein the mapping between film grain patterns of the first set and film grain patterns of the second set is obtained using a similarity metric determined between film grain patterns of the respective first and second sets.

6. The method of claim 1, further comprising:
transmitting the converted second film grain metadata along with a coded video.

7. A computer readable storage medium having stored thereon instructions for causing one or more processors to perform the method of claim 1.

8. An apparatus, comprising one or more processors, wherein said one or more processors operable to:
obtain a first film grain metadata, the first film grain metadata complying with a first film grain syntax and being representative of a first film grain model, and
convert at least one part of the first film grain metadata to at least one part of a second film grain metadata, the second set of film grain metadata complying with a second film grain syntax and being representative of a second film grain model,
wherein the second film grain model is different from the first film grain model, and wherein syntax elements representative of parameters of film grain model are assigned based on a matching of film grain patterns obtained respectively for the first film grain model and for the second film grain model.

9. The apparatus of claim 8, further comprising
at least one of (i) an antenna configured to receive a signal, the signal including data representative of a video and at least one of the first set or the second set of film grain metadata, (ii) a band limiter configured to limit the received signal to a band of frequencies that includes the data representative of video, or (iii) a display configured to display the decoded video with film grain synthetized using the second set of film grain metadata.

10. The apparatus of claim 9, comprising a television (TV), a cell phone, a tablet or a set top box.

11. The apparatus of claim 8, wherein at least one of the first film grain syntax or the second film grain syntax conforms with a video compression standard.

12. The apparatus of claim 8, wherein converting at least one part of the first film grain metadata to at least one part of a second film grain metadata comprises:

identifying a film grain pattern in a set of film grain patterns obtained from different parameters of the second film grain model, that matches a film grain pattern obtained from parameters of the first film grain model of the first film grain metadata, and assigning to syntax elements representative of the second film grain model of the second film grain metadata, film grain model parameters that provided the identified film grain pattern.

13. The apparatus of claim 12, wherein converting at least one part of the first film grain metadata to at least one part of a second film grain metadata further comprises:

determining respectively a first set of film grain patterns from different parameters set of the first film grain model and a second set of film grain patterns from different parameters set of the second film grain model, and obtaining a mapping between film grain patterns of the first set and film grain patterns of the second set.

14. The apparatus of claim 13, wherein the mapping between film grain patterns of the first set and film grain patterns of the second set is obtained using a similarity metric determined between film grain patterns of the respective first and second sets.

15. The apparatus of claim 8, wherein the one or more processors are further configured for transmitting the converted second film grain metadata along with a coded video.

\* \* \* \* \*